United States Patent [19]

Caron et al.

[11] Patent Number: 5,719,972
[45] Date of Patent: Feb. 17, 1998

[54] OPTICAL SWITCH

[75] Inventors: Bernard George Caron, Harrisburg; Warren Hale Lewis, Newport, both of Pa.

[73] Assignee: The Whitaker Corporation, Wilmington, Del.

[21] Appl. No.: 686,886

[22] Filed: Jul. 26, 1996

[51] Int. Cl.$^6$ ................................ G02B 6/26; G02B 6/42
[52] U.S. Cl. ................................................ 385/18
[58] Field of Search ................................ 385/16, 17, 18, 385/19, 21, 22, 140, 25, 47, 33, 37; 359/569, 566, 652

[56] References Cited

U.S. PATENT DOCUMENTS

| | | | |
|---|---|---|---|
| 4,261,638 | 4/1981 | Wagner | 385/25 |
| 4,479,697 | 10/1984 | Kapany et al. | 350/96.18 |
| 4,626,066 | 12/1986 | Levinson | 350/96.18 |
| 4,705,349 | 11/1987 | Reedy | 350/96.15 |
| 4,893,891 | 1/1990 | Fujita et al. | 350/96.2 |
| 4,993,796 | 2/1991 | Kapany et al. | 350/96.15 |
| 5,000,534 | 3/1991 | Watanabe et al. | 350/96.2 |
| 5,031,994 | 7/1991 | Emmons | 350/96.2 |
| 5,056,886 | 10/1991 | Hoult | 385/2 |
| 5,226,104 | 7/1993 | Unterleitner et al. | 385/14 |
| 5,361,315 | 11/1994 | Lewis et al. | 385/16 |
| 5,412,506 | 5/1995 | Feldblum et al. | 359/569 |
| 5,465,238 | 11/1995 | Russell | 369/116 |
| 5,642,446 | 6/1997 | Tsai | 385/16 |

Primary Examiner—Akm E. Ullah
Attorney, Agent, or Firm—Gerald K. Kita

[57] ABSTRACT

An optical switch (1) has a refractive element (3) between a reflector (5) and multiple optical waveguides (6), the refractive element (3) being pivotable to a first position to optically couple a first set of the waveguides (6), the refractive element (3) being pivotable to a second position to optically couple a second set of waveguides (6), a magnet (4) with the refractive element (3) on an inertially balanced holder (2), a ferrous element (32) to which the magnet (4) is attracted, to pivot the refractive element (3) to the first position, and a magnetic coil (29) applying a torque on the magnet (4) and pivoting the refractive element (3) toward the second position.

10 Claims, 5 Drawing Sheets

OPTICAL SWITCH

FIELD OF THE INVENTION

The invention relates to an optical switch wherein a refractive element pivots in the switch for optically coupling different sets of optical waveguides.

BACKGROUND OF THE INVENTION

U.S. Pat. No. 5,361,315 discloses an optical switch comprising: a refractive element between a reflector and multiple optical waveguides, the refractive element being pivotable to a first position to optically couple a first set of the waveguides, and the refractive element being pivotable to a second position to optically couple a second set of the waveguides. Each set of waveguides is optically coupled by light being transmitted from one waveguide of the set to another waveguide of the set.

Angular movement of the refractive element from a desired position is undesired, since such movement, even momentarily, would misdirect the refracted light, and produce an optical discontinuity. When the switch is subjected to linear acceleration, care must be taken to isolate the refractive element from angular movement in response to such linear acceleration, thus to avoid an optical discontinuity. In the past, the refractive element was urged by spring return mechanisms. The return springs of the spring return mechanisms were susceptible to coupling linear acceleration and vibration to angular acceleration of the refractive element, causing an optical discontinuity.

The waveguides are required to be positioned at a desired focus from the reflector. A need exists for an adjustment mechanism to alter the position of the waveguides to a desired focus from the reflector.

SUMMARY OF THE INVENTION

According to the invention, an optical switch for pivoting a refractive element to desired angular positions further prevents linear acceleration from being coupled to angular acceleration of the refractive element. Advantageously, the invention enables the optical switch to withstand large amounts of linear acceleration and vibration levels without experiencing an optical discontinuity.

Further according to the invention, the magnet and the refractive element are on a pivotable holder, and the holder is inertially balanced angularly about a pivot axis, advantageously, to decouple angular acceleration of the refractive element from linear acceleration and vibration. According to an embodiment, the pivot axis intercepts the refractive element and the magnet. An advantage resides in compactness of the optical switch about the pivot axis.

Further according to an embodiment, a magnet is fixed with respect to a pivotable refractive element, and the magnet is attracted to at least one ferrous element with a force of attraction to pivot the refractive element to a first position to optically couple a first set of waveguides, and at least one magnetic coil applies a torque on the magnet to override the force of attraction and pivot the refractive element to a second position to optically couple a second set of waveguides.

An advantage resides in the magnet providing a force of attraction to pivot the refractive element. A further advantage resides in at least one magnetic coil providing a torque on the magnet to override the force of attraction of the magnet and pivot the refractive element to the second position.

According to a further embodiment, the magnet is attracted to a second ferrous element with a force of attraction that tends to retain the refractive element in the second position until at least one magnetic coil provides a torque on the magnet to override the force of attraction and pivot the refractive element to the first position, the torque being reversible and activated by pulsing the magnetic coil with reversible current.

An advantage resides in the torque being reversible to override the force of attraction to one or the other of the ferrous elements to pivot the refractive element to one position or the other.

According to a further embodiment, two magnetic coils are used to provide a uniform magnetic field to override the force of attraction.

Embodiments of the invention will now be described by way of example with reference to the drawings, according to which:

DETAILED DESCRIPTION

Figure 1:
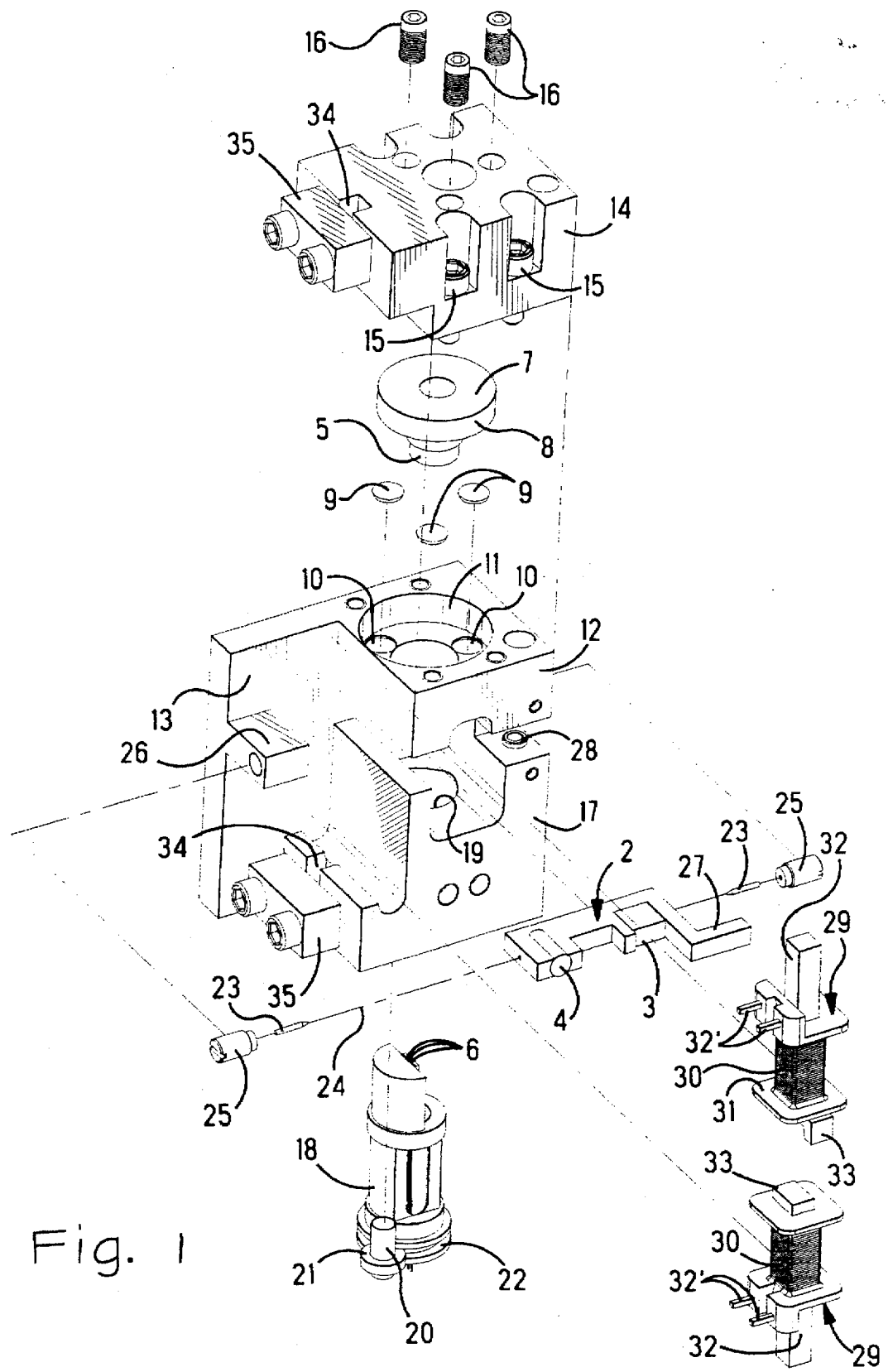
FIG. 1 is an isometric view of an optical switch, with parts separated from one another.
Figure 6:
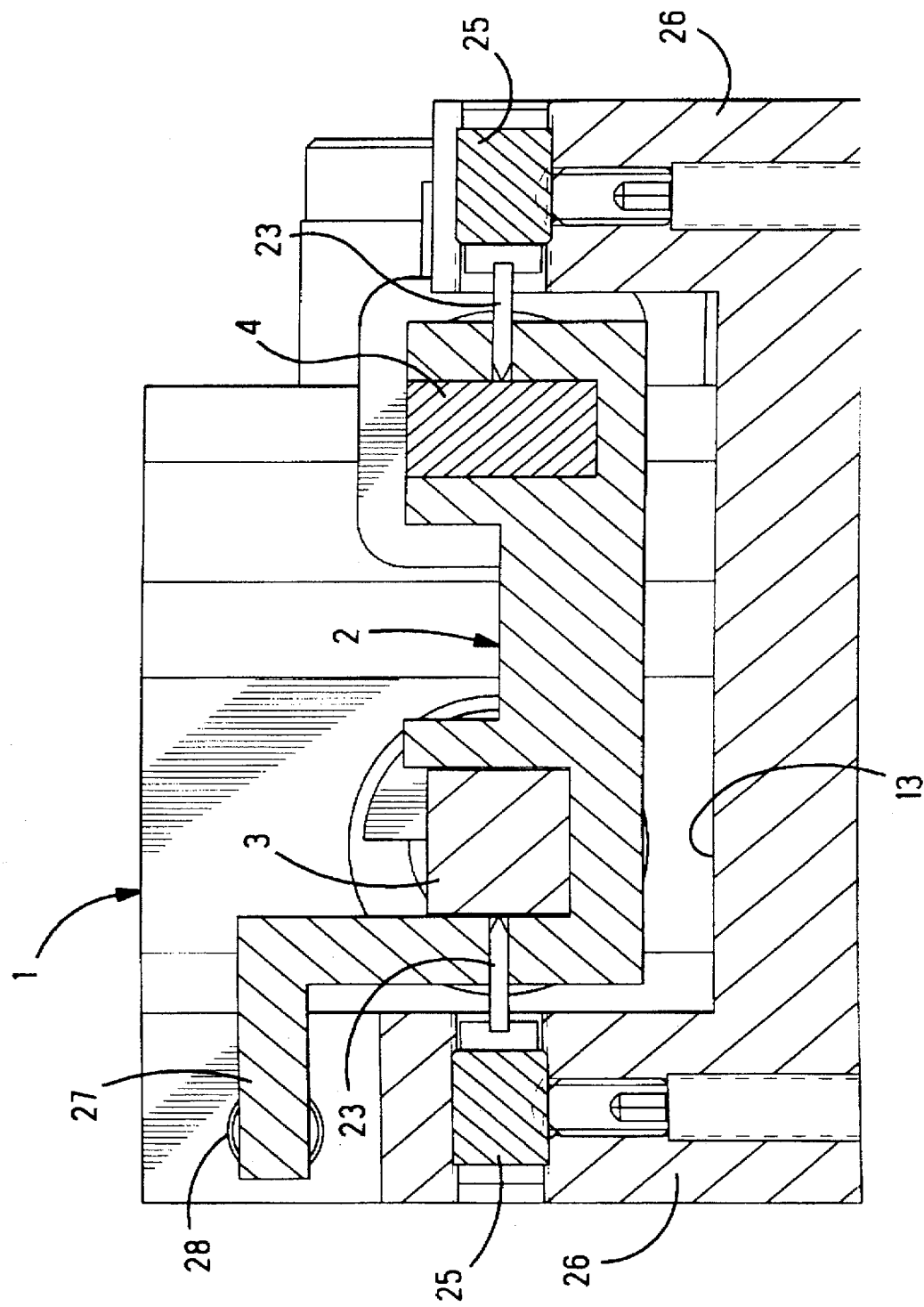
FIG. 6 is a section view taken along the line 6—6 of FIG. 3.
Figure 7:
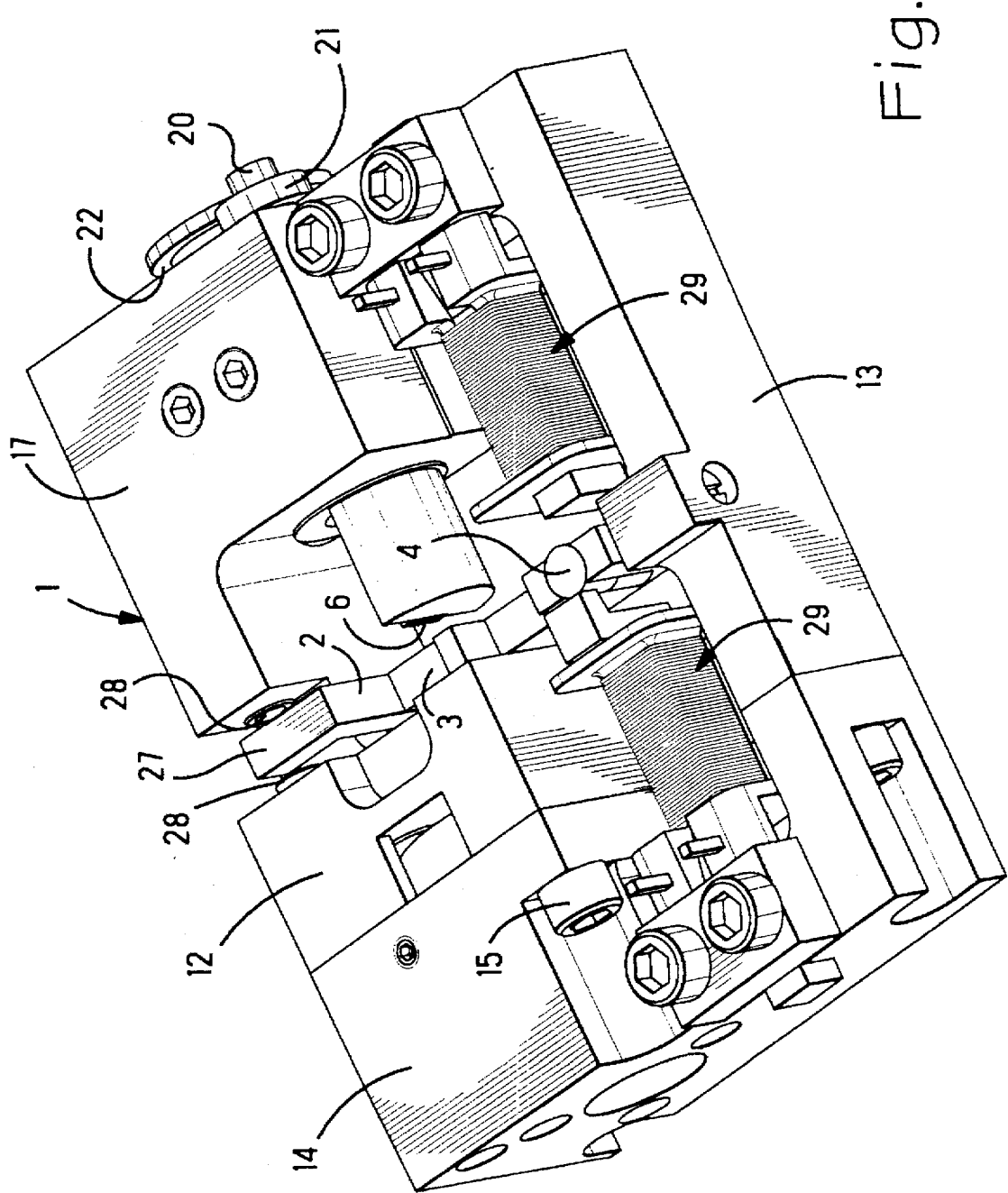
FIG. 7 is a view similar to FIG. 2 of another embodiment of an optical switch.

With reference to FIGS. 1, 6 and 7, an optical switch (1) is constructed with a pivotable holder (2) on which is mounted an optical refractive element (3) and a permanent magnet (4). The refractive element (3) is between a reflector (5) and multiple optical waveguides (6), for example, waveguides (6) in the form of optical fibers.

With reference to FIG. 1, the reflector (5) is a concave mirror held by a reflector holder (7). A radially projecting, circular flange (8) on the reflector holder (7) is supported against three, spaced apart, dome shaped springs (9). The springs (9) are supported in recesses (10) in a reflector receiving cavity (11) in a reflector support block (12). The reflector support block (12) is fixed to a frame (13). A reflector adjustment block (14) covers the reflector holder (7) and is attached with fasteners (15) to the reflector support block (12). Three adjustment screws (16) in the adjustment block (14) engage the flange (8) on the reflector holder (7). Also fixed to the frame (13) is a waveguide support block (17), FIG. 1. The optical waveguides (6) are held in a cylindrical waveguide holder (18), in turn, adjustably received along a waveguide receiving cavity (19) in the waveguide support block (17). A waveguide focus adjustment fastener (20) with a radially projecting flange (21) threadably attaches to the support block (17). The flange (21) registers in a peripheral groove (22) in the waveguide holder (18). The position of the fastener (20) in the support block (17) is threadably adjusted to alter the distance of the waveguides (6) along the cavity (19) to a precise focus relative to the reflector (5).

A preliminary alignment of the reflector (5) is accomplished by translating the mirror holder (7) transversely with respect to the waveguides (6) while translating the waveguides (6) longitudinally using the focus adjustment fastener (20). When this rough adjustment is complete, the reflector holder (7) is brought into contact with the dome springs (9) by tightening the adjustment screws (16). By adjusting the position of each of the screws (16), the flange (8) on the reflector holder (7) will resiliently compress each of the dome shaped springs (9) to aim the focal point of the concave mirror (5) at a precise position in front of the waveguides (6).

With reference to FIGS. 1, 6 and 7, the holder (2) is pivotally supported by pivot pins (23), FIGS. 1 and 6. The pivot pins (23) are axially aligned with each other, and define a pivot axis (24) of the holder (2). The pivot axis (24) projects through the refractive element (3) and the magnet (4). The pivot pins (23) are rotatably supported in respective jeweled bearings (25). Bearing blocks (26) on the frame (13) support the jeweled bearings (25). An offset arm (27) on the holder (2) extends outwardly and offset from the pivot axis (24).

The holder (2) is inertially balanced about the pivot axis (24), to be free from angular acceleration about the pivot axis (24) in response to linear acceleration and vibration experienced by the optical switch (1). Thereby, the inerticily balanced holder (2) decouples the refractive element (3) from angular acceleration in response to linear acceleration and vibration.

Figure 2:
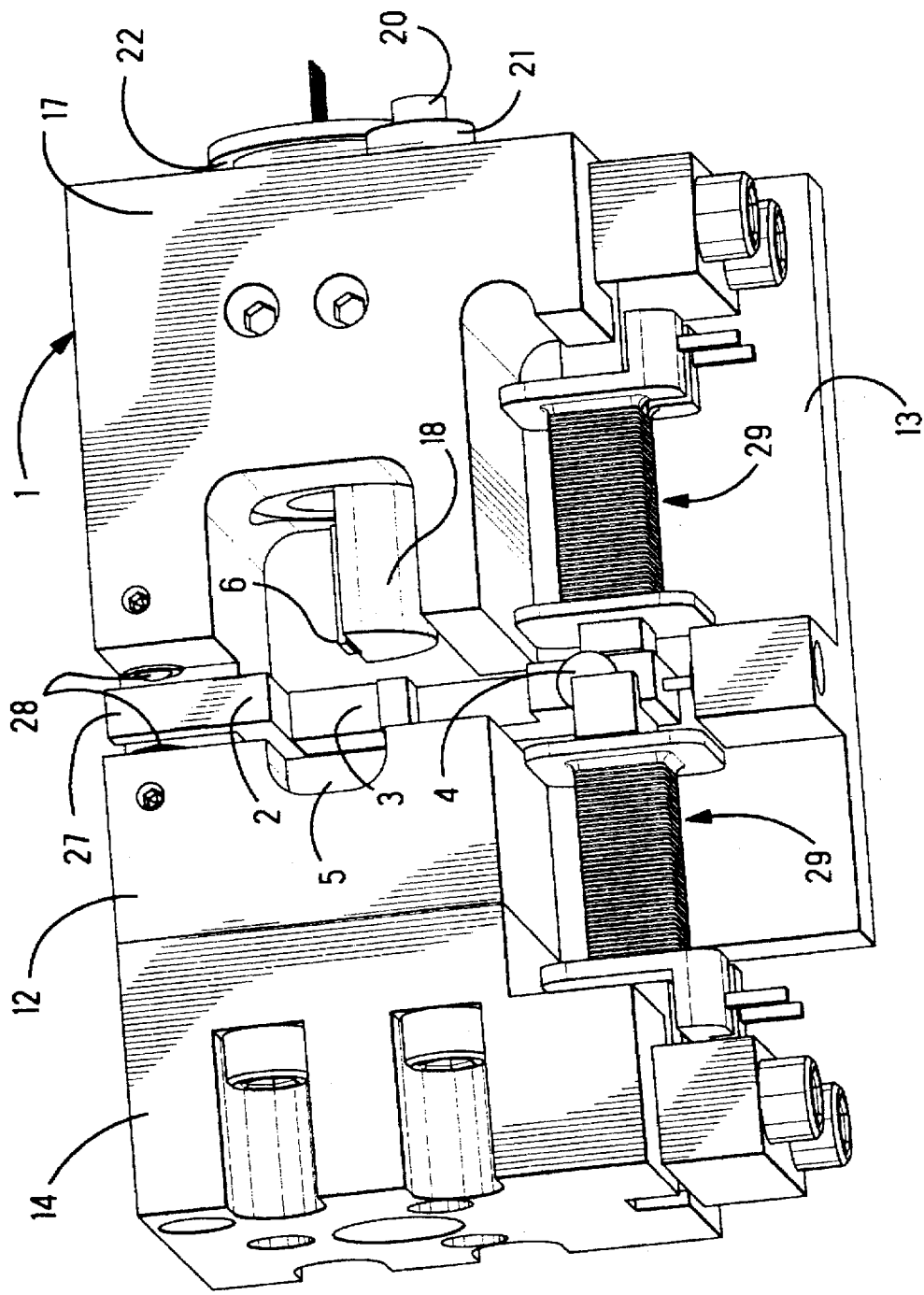
FIG. 2 is an isometric view of the optical switch as shown in FIG. 1 with parts assembled.
Figure 3:
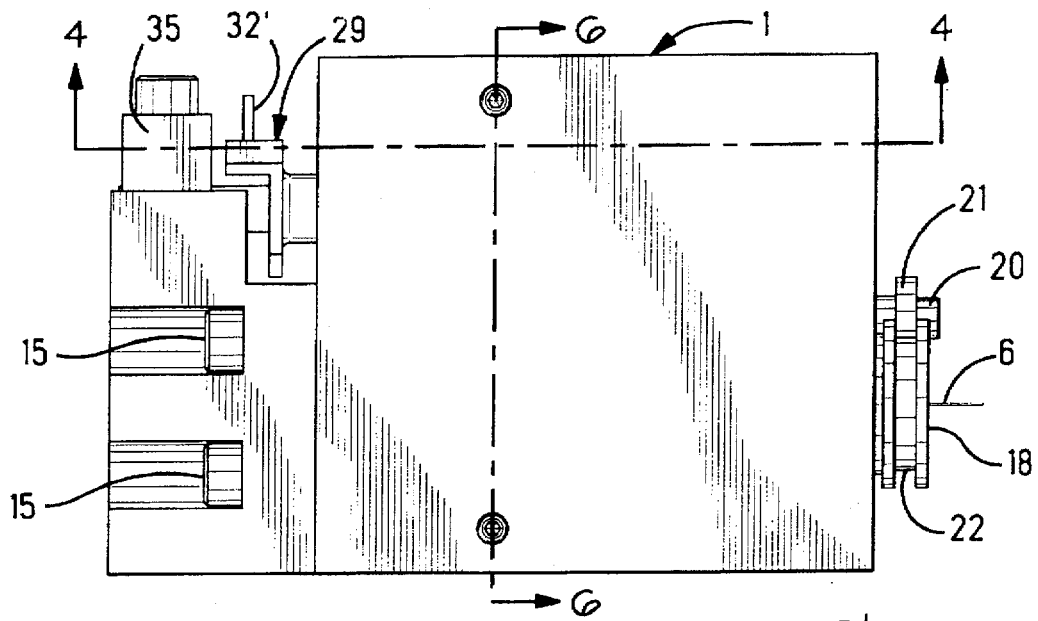
FIG. 3 is a side view of the optical switch as shown in FIG. 2.
Figure 4:
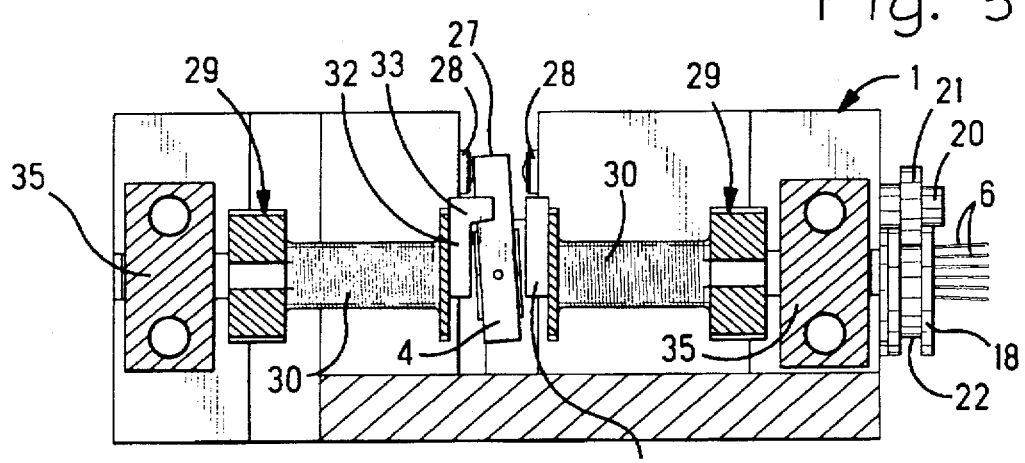
FIG. 4 is a section view taken along the line 4—4 of FIG. 3.
Figure 5:
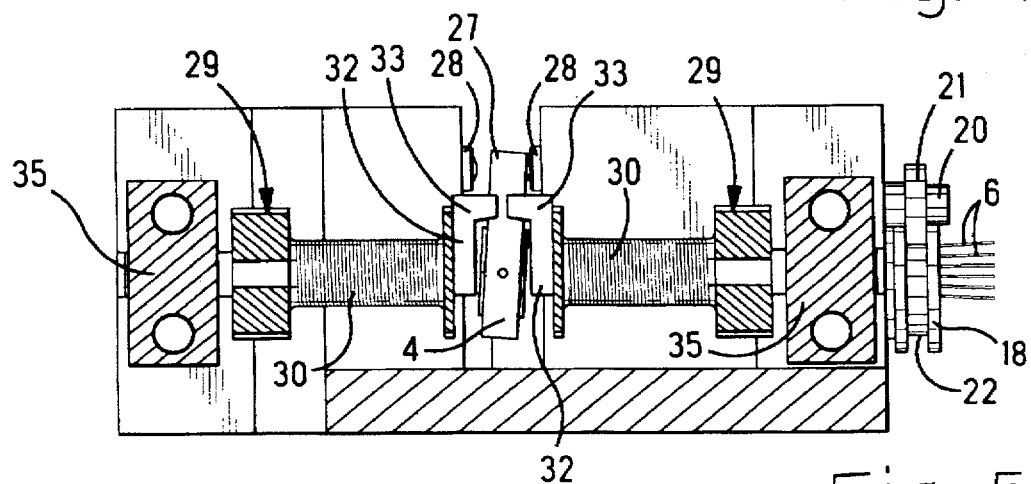
FIG. 5 is a view similar to FIG. 4 of another embodiment of an optical switch.

The offset arm (27) is pivotable between two stops (28), FIGS. 2, 4 and 5, mounted on respective support blocks (12, 17). The position of each of the stops (28) is threadably adjustable. For example, the stops (28) are adjustable stop screws with jeweled surfaces against which the offset arm (27) impinges. The holder (2) is pivoted to a first position, FIG. 4, against one of the stops (27). The holder (2) is pivoted to a second position, FIG. 5, against another of the stops (27).

The refractive element (3) is pivotable, together with the holder (2), to a first position to optically couple a first set of the waveguides (6). The refractive element (3) is pivotable, together with the holder (2), to a second position to optically couple a second set of the waveguides (6). Each set of waveguides (6) is optically coupled by light being transmitted from one waveguide (6) of the set to another waveguide (6) of the set. Operation of the optical switch (1) is described in greater detail in U.S. Pat. No. 5,361,315, to Warren H. Lewis and Gregory B. Powers, granted Nov. 1, 1994, the disclosure of which is incorporated herein by reference. According to the Patent, a first set of optical waveguides comprises first and second optical fibers, and a second set of optical waveguides comprises the first optical fiber and a third optical fiber.

With reference to FIGS. 1, 2, 4, 5 and 6, at least one magnetic coil (29) is utilized to override the force of attraction of the magnet (4), and to pivot the refractive element (3) about the pivot axis (24) of the holder (2), which causes the holder (2) to pivot to the first and second positions. Two coils (29) can be electrically connected, and are spaced apart across a gap within which the magnet (4) moves, as the refractive element (3) pivots between the first and second positions. The two coils (29) provide a more uniform distribution of magnetic flux in a gap within which the magnet (4) moves, as the refractive element (3) pivots from one position to another.

Each of the coils (29) comprises, magnet wire windings (30) on a hollow insulating bobbin (31), the windings (30) being connected in a known manner to a pair of electrical terminals (32') on the bobbin (31). A ferrous element (32) is encircled by the bobbin (31) and the windings (30). In each embodiment shown in FIGS. 4 and 5, a projection (33) on and of a first ferrous element (32) is in the form of a unitary, projecting offset end on a corresponding ferrous element (32). In the embodiment shown in FIG. 5, a similar projection (33) is on a second ferrous element (32), as well as a similar projection (33) being on a first ferrous element (32). Each projection (33) is positioned relative to the pivot axis (24) of the holder (2) to attract the permanent magnet (4). The ferrous elements (32) are mounted along slots (34) in respective blocks (14, 17), and are clamped by clamps (35).

In each of the embodiments of FIGS. 4 and 5, the magnet (4) is attracted with a force of attraction to the projection (33) of a corresponding first ferrous element (32), to impel the magnet (4), and to pivot the refractive element (3) and the holder (2) to the first position, shown in FIG. 4. The magnet (4) tends to remain stationary until at least one coil (29), becomes activated with electrical current of requisite polarity to provide a torque on the magnet (4) that overrides the force of attraction of the magnet to the first ferrous element (32), and to pivot the refractive element (3) from the first position to the second position. With reference to the embodiment of FIG. 4, the current remains on to retain the refractive element (3) in the second position. Further, with reference to the embodiment of FIG. 4, the magnet (4) tends to return to the first ferrous element (32) when current to the coil (29) is turned off.

Preferably, both coils (29) are activated with current of requisite polarity to provide a uniform distribution of magnetic flux in a gap in which the magnet (4) moves as the refractive element(3) pivots between the first and second positions.

In the embodiment of FIG. 5, the magnet (4) tends to remain stationary in the second position until at least one coil (29) becomes activated with electrical current to provide a torque on the magnet (4) that overrides the force of attraction of the magnet (4) to the corresponding second ferrous element (32), and to pivot the refractive element (3) to the first position. To retain the refractive element (3) in the first position, the current in said at least one coil (29) is turned off. Thus, to pivot the refractive element (3) to the first position, only a pulse of current of requisite polarity is needed.

The magnet tends to remain stationary with the refractive element (3) in the new, first, position until said at least one coil (29) becomes activated with electrical current of requisite polarity to provide a torque on the magnet (4) that overrides the force of attraction of the magnet (4) to the first ferrous element(32), and to pivot the refractive element (3) to the second position. Thus, to retain the refractive element (3) in the first position, the current to said at least one coil (29) is turned off. To change the position of the refractive element (3) from one position to the other, only a pulse of current through said at least one coil (29) is needed of requisite polarity.

According to the embodiment of FIG. 5, said at least one coil (29) is provided with reversible current, to provide a torque that is reversible and activated by pulsing said at least one magnetic coil (29) with the reversible current.

An advantage resides in the torque being reversible to override the force of attraction to one or the other of the ferrous elements (32) to pivot the refractive element (3) to one position or the other.

Preferably, both coils (29) are activated with current of requisite polarity to provide a uniform distribution of magnetic flux in a gap within which the magnet (4) moves as the refractive element (3) pivots between the first and second positions.

An advantage of the invention resides in a rugged optical switch for optically coupling different sets of optical waveguides, wherein an inertially balanced holder decouples the switch from angular acceleration in response to linear acceleration and vibration.

Other embodiments and modifications of the invention are intended to be covered by the spirit and scope of the appended claims.

What is claimed is:

1. An optical switch comprising: a refractive element between a reflector and multiple optical waveguides, a magnet fixed relative to the refractive element, a ferrous element to which the magnet is attracted with a force of attraction to pivot the refractive element to a first position to optically couple a first set of the waveguides, and at least one magnetic coil to override the force of attraction and pivot the refractive element to a second position to optically couple a second set of the waveguides.

2. An optical switch as recited in claim 1 and further comprising: a second magnetic coil to override the force of attraction and pivot the refractive element to said second position.

3. An optical switch as recited in claim 1 and further comprising: a second ferrous element, the magnet being attracted with a force of attraction to the second ferrous element, and said at least one magnetic coil overriding the force of attraction of the magnet to the second ferrous element and pivoting the refractive element to said first position.

4. An optical switch as recited in claim 1, and further comprising: a second ferrous element attracting the magnet to retain the refractive element in said second position.

5. An optical switch as recited in claim 1 wherein the refractive element and the magnet are mounted on a pivotable holder.

6. An optical switch comprising: a refractive element between a reflector and multiple optical waveguides, the refractive element being pivotable to a first position to optically couple a first set of the waveguides, the refractive element being pivotable to a second position to optically couple a second set of waveguides, the improvement comprising: a magnet and the refractive element mounted on a pivoting holder, the holder being inertially balanced about a pivot axis, a first ferrous element to which the magnet is attracted to impel the magnet and pivot the refractive element to the first position, and at least one magnetic coil to override a force of attraction of the magnet to the first ferrous element, and pivot the refractive element to the second position.

7. An optical switch as recited in claim 6, wherein the improvement further comprises: a second ferrous element to which the magnet is attracted, to retain the refractive element in the second position, and said at least one coil being activated with current of the requisite polarity to override a force of attraction of the magnet to the second ferrous element, and pivot the refractive element to the first position.

8. An optical switch comprising: a refractive element between a reflector and multiple optical waveguides, the refractive element being pivotable to a first position to optically couple a first set of the waveguides, the refractive element being pivotable to a second position to optically couple a second set of waveguides, a magnet and the refractive element being mounted on a pivoting holder, the holder being inertially balanced about a pivot axis, a first ferrous element to which the magnet is attracted to impel the magnet and pivot the refractive element to the first position, and at least one magnetic coil to override a force of attraction of the magnet to the first ferrous element, and pivot the refractive element to the second position.

9. An optical switch as recited in claim 8, and further comprising: a second ferrous element to which the magnet is attracted to retain the refractive element in the second position, and said at least one coil being activated with current of the requisite polarity to override a force of attraction of the magnet to the second ferrous element, and pivot the refractive element to the first position.

10. An optical switch as recited in claim 8, and further comprising: a second coil connected with the first named coil, and the second coil and the first named coil being spaced apart on opposite sides of a gap in which the magnet moves as the refractive element is pivoted between the first and second positions.

* * * * *